No. 885,960. PATENTED APR. 28, 1908.
E. C. SHAW.
VEHICLE WHEEL RIM.
APPLICATION FILED FEB. 20, 1907.

WITNESSES:
Walter F. Thompson
Oliver Williams

INVENTOR
Edwin Copland Shaw

BY
Seward Davis
ATTORNEY

UNITED STATES PATENT OFFICE.

EDWIN COUPLAND SHAW, OF AKRON, OHIO, ASSIGNOR TO B. F. GOODRICH COMPANY, OF AKRON, OHIO, A CORPORATION OF OHIO.

VEHICLE-WHEEL RIM.

No. 885,960.     Specification of Letters Patent.     Patented April 28, 1908.

Application filed February 20, 1907. Serial No. 358,463.

*To all whom it may concern:*

Be it known that I, EDWIN COUPLAND SHAW, a citizen of the United States, residing in the city of Akron, county of Summit and State of Ohio, have invented certain new and useful Improvements in Vehicle-Wheel Rims, of which the following is a specification, reference being had to the accompanying drawings, which form a part thereof.

My invention relates to that class of vehicle wheel rims adapted for use with tires of resilient materials, and more particularly to rims adapted for use with detachable tires.

I have described and claimed in a companion application an improved vehicle wheel rim having one tire flange mounted upon the rim proper or channel-iron, an opposing tire flange mounted upon a removable transversely split ring, and means for securing locking engagement between the split ring and the channel-iron.

The object of the invention described and claimed in the present application is to provide a useful modification of the means for securing locking engagement between the channel-iron and the split ring upon which the removable tire flange is carried. I accomplish this object by means of a retaining flange upon the channel-iron, two downwardly extending lugs upon the split ring, near its terminals, two slots in the channel-iron adapted to receive said lugs, and a screw or key adapted to pass through an upwardly projecting lug upon the channel-iron and through mutually registering grooves extending laterally through the contacting surfaces of the split ring terminals.

Figure 1:
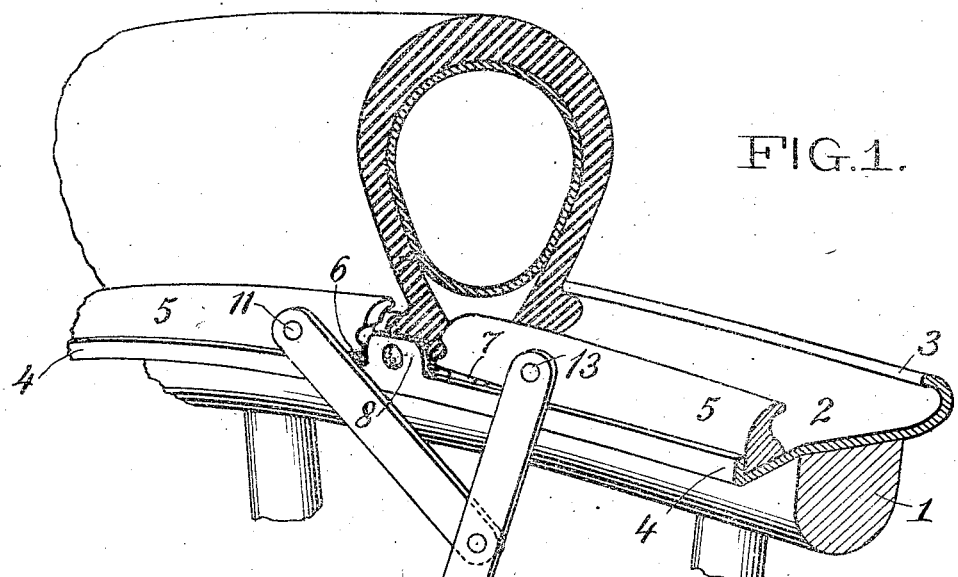
Figure 2:
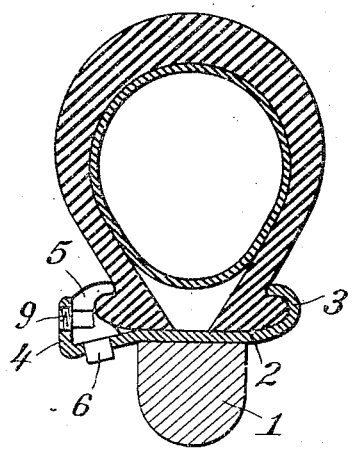
Figure 3:
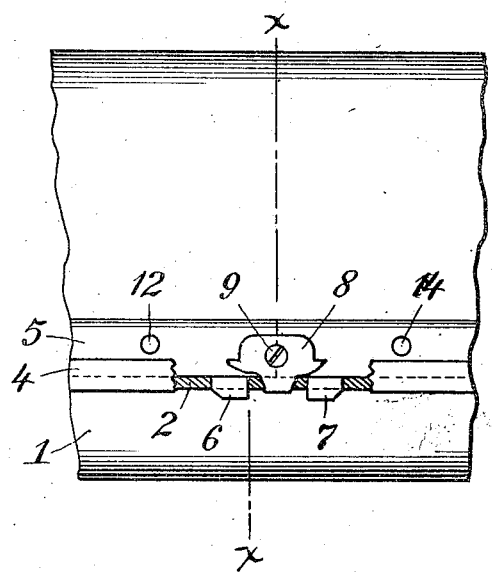

In the drawings Figure 1 is a perspective view showing a section of the tire and my improved means for attaching the tire to the wheel. Fig. 2 is a cross-section of the tire and rim upon the broken line of *x x* Fig. 3 showing the means for securing locking engagement between the channel-iron and the flange-bearing ring. Fig. 3 is a side view of the tire and rim, a part being broken away to show details of construction of the locking means.

I have shown my device as applied to a tire and rim of the clencher type, in which the flanges are curved upwardly and inwardly to grasp and hold beads formed upon the tire casing, but it will be obvious to those skilled in the art that by altering the shape of the tire flanges my device can be adapted for use with tires of any form.

Referring to the drawings: In Fig. 1, 1 is the wheel felly, the channel-iron 2 being adapted to be affixed thereto. Formed upon or permanently secured to this rim is the flange 3, adapted to engage one edge of the tire. At its other edge the rim or channel-iron is extended laterally and the portion beyond the wheel felly preferably has a slight downward tendency toward the hub of the wheel. This edge terminates in an upturned retaining flange 4 extending the entire length of the rim, forming a seat for the removable ring 5 and securing it against laterally outward displacement. The form of this portion of the channel-iron may of course be varied; for example, it may have a downward offset instead of the inclination, but the essential feature is that the upper edge of the retaining flange must be on a level with or below the surface of the main portion of the rim, so that a tire can be slipped over it without stretching. The form of the retaining flange is likewise immaterial, except that the flange or its equivalent must form a seat for the removable ring, adapted to secure it from laterally outward movement. The removable ring 5 comprises a base portion and a second tire flange. The base portion has its under-surface formed to seat upon the extension of the rim in such a manner that when the ring is seated the tire flange is in position to engage the edge of the tire. This ring is continuous except at a single point where it is transversely split to allow it to be attached or removed at will. Upon the under-side of this ring, and near its terminals, are provided two lugs 6 and 7, the posterior edges of which are preferably beveled. In the portion of the channel-iron which carries the removable ring and at any convenient point upon its periphery are cut slots shaped to receive these lugs and so located that when the lugs are inserted therein the ring terminals contact in longitudinal alinement. The lugs may be placed at the ends of the ring terminals so that their anterior faces are flush with the ring ends. In this case a single slot is sufficient. The structure is stronger, however, if the lugs are separate and two slots are provided. Upon the retaining flange 4, at a point opposite to the joint of the split ring, when the latter is in position, is provided an upwardly extending lip or lug 8 which is perforated to admit a screw or key 9. In the contacting surfaces of the ring terminals and registering with the perforation in the lip 8 are provided mutually registering grooves and the center of the hole thus formed is in the plane of the contacting surfaces. A bolt or key-pin 9 is provided, adapted to pass through these two holes and to secure the ring terminals to the lip 8.

The operation of my device is as follows: To attach a tire the split ring is removed, the tire applied to the rim and made to engage closely with the permanent tire flange along its entire length; the split ring is then sprung into place about the channel-iron and made to engage closely with its seat, the two lugs being forced into the slots provided for them in the rim. The key 9 is then forced through the lip 8 upon the retaining flange and through the grooves in the contacting surfaces of the ring terminals. In this position the tire and removable flange are firmly locked to the channel-iron. The retaining flange 4 prevents laterally outward displacement of the split ring, the lugs 6 and 7 which are inserted in the slots prevent any "creeping" or movement of the ring about the rim, and the screw 9 secures the ring terminals to the channel-iron and locks the lugs in the slots. To remove the tire this operation is reversed: The screw 9 is removed, whereupon the lugs can be removed from the slots and the split ring and the tire detached. If desired both tire flanges may be made detachable by duplicating the split ring and the attaching means but in practice this is usually found unnecessary and undesirable. Again the split ring may be constructed in two or more sections by providing similar locking means at the terminals of the several sections and with large and heavy structures this may be found advantageous. The split ring should be formed to fit accurately within its seat and to the channel-iron, and in consequence it may be found difficult to draw together the split ring terminals and to insert the lugs within the slots. To facilitate this operation I provide a jointed lever 10, as shown in Fig. 1. A pin 11 in one arm is inserted in a hole 12 drilled in one of the ring terminals, near its extremity, and a pin 13 upon the other arm of the lever is inserted in a hole 14 drilled in the other ring terminal, near its extremity. Thereupon, by means of the lever, the ring terminals can be drawn together, the lugs inserted in the slots and the screw adjusted.

Having described my invention what I claim is:

1. A vehicle wheel rim comprising a channel-iron carrying one permanent tire flange, a removable split ring carrying an opposing tire flange, downwardly extending lugs upon the split ring, near its terminals, slots in said channel-iron adapted to receive the said lugs, a lip or lug extending upwardly from the channel-iron, and a key adapted to pass through said upwardly extending lip and through mutually registering grooves in the contacting surfaces of the ring terminals.

2. Means for securing a detachable tire flange to the channel-iron of a vehicle wheel rim comprising downwardly extending lugs upon the detachable flange near its terminals, slots in the channel-iron adapted to receive said lugs, an upwardly extending lip upon said channel-iron opposite the ring joint and a key adapted to pass through said lip and through a perforation in the contacting surfaces of the ring terminals.

3. In a vehicle wheel rim the combination of a channel-iron carrying a permanent tire flange, an opposing tire flange mounted upon a removable transversely split ring, and means for securing said ring to said channel-iron, comprising a retaining flange along the edge of the channel-iron, downwardly extending lugs upon said split ring, near its terminals, and a bolt adapted to pass through mutually registering grooves extending through the contacting surfaces of the ring terminals and through an upwardly projecting lug upon said channel-iron.

4. A two-part channel-iron for use with vehicle wheels, the one member seated upon the wheel felly and having its edges formed into flanges, one flange formed to retain the tire and the other forming a seat for the second member of the channel-iron, said second member comprising a transversely split ring having downwardly extending lugs near its terminals adapted to fit within slots in the channel-iron, means being provided for securing the terminals of said lugs to an upwardly projecting lug formed upon said channel-iron.

5. The combination in a vehicle wheel rim of a channel-iron having at one edge a flange for engagement with the tire, and at its opposite edge a downwardly inclined portion terminating in an upwardly projecting retaining flange adapted to form a seat for a split ring, said split ring comprising a base fitted to said seat, a flange for engagement with the tire, and two downwardly extending lugs, near the terminals of said ring, adapted to enter slots in said channel-iron; and a key passing through a hole drilled in the terminals of said split ring and through an upwardly projecting flange upon said channel-iron.

6. Means for locking a detachable cross-split tire flange to the channel-iron of a vehicle wheel rim comprising a retaining flange along the edge of said channel-iron, an upwardly extending lip upon said retaining flange, a key adapted to pass through said lip and through mutually registering grooves in the contacting faces of the detachable flange terminals, downwardly extending lugs upon said terminals, and slots in the channel-iron adapted to receive said lugs.

7. Means for securing locking engagement between the channel-iron of a vehicle wheel rim and the sections of a removable tire flange, comprising lugs extending downwardly from said sections near their terminals, slots in the channel-iron adapted to receive said lugs, an upwardly projecting lip upon said channel-iron opposite the plane of contact of each pair of terminals of said sections, and a key adapted to pass through each lip and through mutually registering grooves in the contacting faces of the adjacent section terminals.

8. In a vehicle wheel rim the combination of a channel iron 2, carrying a retaining flange 4, a split ring 5, carrying a tire flange, lugs 6 and 7 extending downwardly from the terminals of said split ring, slots in said channel iron adapted to receive said lugs, a lip 8 extending upwardly from said retaining flange and a key 9 adapted to pass through said lip and to engage within mutually registering grooves in the contacting faces of the ring terminals, substantially as described.

EDWIN COUPLAND SHAW.

Witnesses:
C. C. GOODRICH,
W. K. MEKUS.